United States Patent
Tanaka et al.

(10) Patent No.: US 9,678,227 B2
(45) Date of Patent: Jun. 13, 2017

(54) RADIATION ANALYZING APPARATUS

(71) Applicant: HITACHI HIGH-TECH SCIENCE CORPORATION, Minato-ku, Tokyo (JP)

(72) Inventors: Keiichi Tanaka, Tokyo (JP); Satoshi Nakayama, Tokyo (JP)

(73) Assignee: HITACHI HIGH-TECH SCIENCE CORPORATION (JP)

( * ) Notice: Subject to any disclaimer, the term of this patent is extended or adjusted under 35 U.S.C. 154(b) by 0 days.

(21) Appl. No.: 14/994,195

(22) Filed: Jan. 13, 2016

(65) Prior Publication Data

US 2016/0209525 A1    Jul. 21, 2016

(30) Foreign Application Priority Data

Jan. 20, 2015   (JP) .................................. 2015-008547

(51) Int. Cl.
  *G01T 1/36* (2006.01)
  *G01T 7/00* (2006.01)
  *G01T 1/16* (2006.01)

(52) U.S. Cl.
  CPC ............. *G01T 1/36* (2013.01); *G01T 1/1606* (2013.01); *G01T 7/005* (2013.01)

(58) Field of Classification Search
  CPC  G01T 1/16; G01T 1/26; G01T 1/1606; G01T 1/36; G01T 7/005; G01N 23/225; G01N 23/00
  See application file for complete search history.

(56) References Cited

U.S. PATENT DOCUMENTS

| 5,090,819 A | * | 2/1992 | Kapitulnik | ................ G01J 5/20 250/336.2 |
| 5,641,961 A | | 6/1997 | Irwin et al. | ................ 250/336.2 |
| 2014/0048717 A1 | | 2/2014 | Tanaka et al. | ................ 250/395 |

FOREIGN PATENT DOCUMENTS

| JP | 2007033392 | 2/2007 |
| JP | 2009271016 | 11/2009 |
| JP | 2014038074 | 2/2014 |

OTHER PUBLICATIONS

European Search Report mailed Jun. 3, 2016 in European Application No. EP 16 15 1999.

(Continued)

*Primary Examiner* — David Porta
*Assistant Examiner* — Faye Boosalis
(74) *Attorney, Agent, or Firm* — Adams & Wilks (57) ABSTRACT

A superconductive transition edge sensor detects radiation. A wave height analyzer generates an energy spectrum of radiation using a detection signal which is output from the superconductive transition edge sensor. A temperature control section and a base line monitor mechanism acquire a physical quantity of data having correlation with detection sensitivity of the superconductive transition edge sensor. A sensitivity correction arithmetic operation unit associates the physical quantity of a plurality of pieces of the acquired data at a plurality of different timings over a predetermined period of time with the detection signal at a certain timing and corrects the detection signal at the certain timing in accordance with the detection sensitivity of the superconductive transition edge sensor by using information regarding the correlation between the physical quantity of the plurality of pieces of data and the detection sensitivity of the superconductive transition edge sensor.

7 Claims, 5 Drawing Sheets

(56) References Cited

OTHER PUBLICATIONS

Keiichi Tanaka et al: "Transition Edge Sensor (TES) X-Ray Detecting System with Sensitivity Correction to Stabilize the Spectrum Peak Center", Key Engineering Materials, vol. 617, Jan. 1, 2014 (Jan. 1, 2014), pp. 233-236, XP055273922, DOI: 10.4028/www.scientific.net/KEM.617.233 * abstract * * p. 235; figures 2,3 *.

* cited by examiner

RADIATION ANALYZING APPARATUS

CROSS-REFERENCE TO RELATED APPLICATIONS

This application claims priority from Japanese Patent Application No. 2015-008547 filed on Jan. 20, 2015, the entire subject-matter of which is incorporated herein by reference.

TECHNICAL FIELD

The disclosure relates to a radiation analyzing apparatus including a radiation detector constituted by a superconductive transition edge sensor.

BACKGROUND

Examples of a radiation analyzing apparatus capable of discriminating radiation energy include an energy dispersive spectroscopy (hereinafter, referred to as EDS) and a wavelength dispersive spectroscopy (hereinafter, referred to as WDS).

The EDS is an X-ray detector of a type that converts the energy of X-rays taken into a detector into an electrical signal in the detector and calculates the energy by the magnitude of the electrical signal. In addition, the WDS is an X-ray detector of a type that monochromatizes (energy discrimination) X-rays using a spectroscope and detects the monochromatized X-rays using a proportional counter tube or the like.

As the EDS, semiconductor detectors such as a silicon lithium (SiLi) type detector, a silicon-drift type detector, and a germanium detector are known. For example, a silicon lithium type or silicon-drift type detector is often used in an element analyzing apparatus of an electron microscope, and can detect energy in a wide range from approximately 0.2 keV to 20 keV. However, since silicon is used for the detector, the properties thereof, in principle, depend on a band gap (approximately 1.1 eV) of silicon, and thus it is difficult to improve an energy resolution to equal to or greater than approximately 130 eV, and the energy resolution becomes lower by 10 times or more than that of the WDS.

In this manner, the wording "energy resolution which is one of indexes indicating the performance of an X-ray detector is, for example, 130 eV" means that energy can be detected by uncertainty of approximately 130 eV when the X-ray detector is irradiated with X-rays. Therefore, as the uncertainty becomes lower, the energy resolution becomes higher. That is, when characteristic X-rays constituted by two adjacent spectrums are detected, uncertainty becomes lower as an energy resolution becomes higher. When a difference in energy between two adjacent peaks is approximately 20 eV, it is possible to, in principle, separate the two peaks from each other by an energy resolution of approximately 20 eV to 30 eV.

In recent years, superconductive X-ray detectors, which are energy dispersive type detectors, having the same energy resolution as that of a WDS have attracted attention. Among these superconductive X-ray detectors, a detector including a superconductive transition edge sensor (hereinafter, referred to as a TES) is a high-sensitivity calorimeter using a sharp resistance change (for example, a resistance change is 0.1Ω when a temperature change is several mK) when a metal thin film transitions from a superconductive state to a normal conductive state. Incidentally, the TES is also referred to as a micro calorie meter.

The TES analyzes a sample by detecting a temperature change occurring within the TES when fluorescent X-rays or characteristic X-rays generated from the sample by radiation irradiation with primary X-rays, primary electron beams, or the like are incident thereon. The TES has an energy resolution higher than those of other detectors, and can obtain an energy resolution of, for example, equal to or less than 10 eV in characteristic X-rays of 5.9 keV.

When a TES is installed in a scanning electron microscope or a transmission electron microscope, characteristic X-rays generated from a sample irradiated with an electron beam are acquired by the TES, and thus it is possible to easily separate peaks of energy spectrums of characteristic X-rays (for example, Si-Kα, W-Mα, or W-Mβ) which are not separable by a semiconductor type X-ray detector.

Incidentally, in an X-ray analyzing apparatus adopting the superconductive X-ray detector, a superconducting quantum interference device (hereinafter, referred to as a SQUID) amplifier is used to read out an extremely small current change in the TES. In order to realize a high energy resolution of the TES, it is important to keep a current flowing to the SQUID amplifier constant. This is because a change in a current flowing to the SQUID amplifier has to be reduced in order to obtain a high energy resolution, as described later.

As an apparatus for keeping a current flowing to the SQUID amplifier, that is, a base line current flowing to the TES constant, there is known, for example, an X-ray analyzing apparatus that corrects, when the base line current flowing to the TES deviates from a fixed value and fluctuates, a current flowing to the TES or a wave height value based on the current in accordance with the fluctuation width thereof (see JP 2009-271016 A).

In addition, there is known a radiation analyzing apparatus that corrects a wave height value of a signal pulse of a TES on the basis of correlation between an output of a heater embedded into a pedestal having the TES installed thereon and a base line current flowing to the TES (see JP 2014-38074 A). The radiation analyzing apparatus acquires in advance characteristics of the correlation between the output of the heater and the sensitivity of the TES, and corrects the wave height value of the signal pulse of the TES using the sensitivity of the TES corresponding to the output of the heater when a signal pulse of the TES is acquired during the actual measurement.

However, in the above-mentioned X-ray analyzing apparatus and radiation analyzing apparatus, in a case where errors of detection values increase in each of the base line current and the output of the heater immediately before the actual measurement, or the like, the using of the detection values results in a concern that it is not possible to appropriately correct a signal pulse.

SUMMARY

Illustrative aspects of the present invention to provide a radiation analyzing apparatus capable of suppressing a deterioration in correction accuracy due to fluctuations in errors of pieces of detection data used to correct a signal pulse.

(1) According to one illustrative aspect of the present invention, there may be provided a radiation analyzing apparatus comprising: a superconductive transition edge sensor configured to detect radiation; a spectrum generation unit configured to generate an energy spectrum of the radiation using a detection signal which is output from the superconductive transition edge sensor; a data acquisition unit configured to acquire a physical quantity of data having correlation with detection sensitivity of the superconductive transition edge sensor; and a sensitivity correction unit configured to associate the detection signal output from the superconductive transition edge sensor at a certain timing with the physical quantity of a plurality of pieces of data acquired by the data acquisition unit at a plurality of different timings over a predetermined period of time and to correct the detection signal output at said certain timing in accordance with the detection sensitivity of the superconductive transition edge sensor by using information regarding correlation between the physical quantity of the plurality of pieces of data and the detection sensitivity of the superconductive transition edge sensor.

According to the radiation analyzing apparatus of the aspect described in the above (1), it is possible to perform the sensitivity correction of a detection signal which is output from the superconductive transition edge sensor by arbitrarily setting temporal correspondence between a physical quantity of data having correlation with the detection sensitivity of the superconductive transition edge sensor and the detection signal. Thereby, it is possible to appropriately perform the sensitivity correction of the detection signal in a state where a desired accuracy and reliability of the physical quantity of data are secured, while avoiding a period in which the accuracy and reliability of the physical quantity of data are low.

(2) In the radiation analyzing apparatus according to the above (1), wherein the sensitivity correction unit corrects the detection signal at said certain timing in accordance with the detection sensitivity of the superconductive transition edge sensor by using the information regarding correlation between average value of the physical quantity of the plurality of pieces of data and the detection sensitivity of the superconductive transition edge sensor.

Further, in the case of the above (2), even when the physical quantity of data fluctuates temporally, the sensitivity correction of the detection signal is performed by adopting an average behavior of the physical quantity of data, and thus it is possible to suppress a deterioration in correction accuracy due to fluctuations in errors of the physical quantity of data.

(3) In the radiation analyzing apparatus according to the above (1) or (2), wherein the data acquisition unit is configured to add time information to the physical quantity of data, the time information regarding a timing at which each of the physical quantity of the plurality of pieces of data is acquired, and wherein the sensitivity correction unit corrects the detection sensitivity of the superconductive transition edge sensor by using the time information added to each of the physical quantity of the plurality of pieces of data.

Further, in the case of the above (3), the time information added to the physical quantity of data is used, and thus it is possible to easily associate the physical quantity of a plurality of pieces of data at an appropriate timing with a detection signal at a certain timing.

(4) In the radiation analyzing apparatus according to any one of the above (1) to (3), wherein the data acquisition unit acquires an output of a heater that heats the superconductive transition edge sensor as the physical quantity.

Further, in the case of the above (4), it is possible to appropriately correct the detection sensitivity of the superconductive transition edge sensor with respect to an output of a heater having correlation with the detection sensitivity of the superconductive transition edge sensor.

(5) In the radiation analyzing apparatus according to any one of the above (1) to (3), wherein the data acquisition unit acquires a current flowing to the superconductive transition edge sensor as the physical quantity.

Further, in the case of the above (5), it is possible to appropriately correct the detection sensitivity of the superconductive transition edge sensor with respect to a current flowing to the superconductive transition edge sensor having correlation with the detection sensitivity of the superconductive transition edge sensor.

According to the radiation analyzing apparatus of the present invention, it is possible to perform the sensitivity correction of a detection signal which is output from the superconductive transition edge sensor by arbitrarily setting temporal correspondence between a physical quantity of data having correlation with the detection sensitivity of the superconductive transition edge sensor and the detection signal. Thereby, it is possible to appropriately perform the sensitivity correction of the detection signal in a state where a desired accuracy and reliability of the physical quantity of data are secured, while avoiding a period in which the accuracy and reliability of the physical quantity of data are low. It is possible to suppress a deterioration in correction accuracy due to fluctuations in errors of the physical quantity of data used to correct a signal pulse.

DETAILED DESCRIPTION

Hereinafter, a radiation analyzing apparatus according to an illustrative embodiment of the present invention will be described with reference to the accompanying drawings.

A radiation analyzing apparatus 100 according to the present illustrative embodiment is an apparatus which is usable as a composition analyzing apparatus such as an electron microscope, an ion microscope, an X-ray microscope, or a fluorescent X-ray analyzing apparatus.

Figure 1:
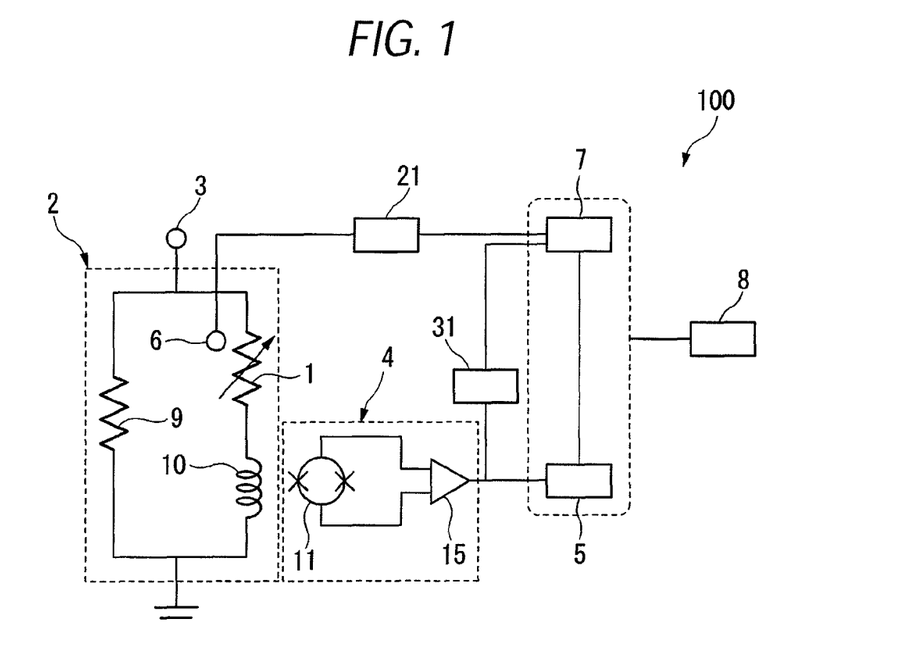
FIG. 1 is a schematic diagram illustrating a configuration of a radiation analyzing apparatus according to an illustrative embodiment of the present invention.

As illustrated in FIG. 1, the radiation analyzing apparatus 100 includes a TES 1, a sensor circuit section 2, a bias current source 3, a current detection mechanism 4, a wave height analyzer 5, a first thermometer 6, a sensitivity correction arithmetic operation unit 7, and a spectrum display section 8.

The TES 1 detects radiation energy as a temperature change when receiving radiation, and outputs the temperature change as a current signal. The sensor circuit section 2 is connected to the TES 1. The bias current source 3 applies a current for making the sensor circuit section 2 perform constant voltage driving in a pseudo manner, to the sensor circuit section 2. The current detection mechanism 4 detects a current flowing to the TES 1. The wave height analyzer 5 measures a wave height value of a signal pulse detected by the current detection mechanism 4. The first thermometer 6 is embedded into a pedestal for installing the sensor circuit section 2 and measures the temperature of a heat sink having the TES 1 installed thereon. The sensitivity correction arithmetic operation unit 7 corrects a wave height value of a signal pulse measured by the wave height analyzer 5 on the basis of temperature data output from the first thermometer 6 and a fluctuation in current flowing to the TES 1. The spectrum display section 8 displays an energy spectrum using a signal pulse having been subjected to sensitivity correction by the sensitivity correction arithmetic operation unit 7.

Hereinafter, the principle of operation of the TES 1 according to the illustrative embodiment of the present invention will be described. The TES 1 uses superconductive transition of a superconductive body, and holds an operation point in an intermediate state between a normal conductive state and a superconductive state in a detection operation of radiation. Thereby, when one piece of radiation is absorbed into the TES 1, for example, a resistance change of several mΩ is obtained with respect to a temperature fluctuation of 100 μK in a state where the operation point is held during superconductive transition, and thus it is possible to obtain a radiation pulse of the μA order.

In addition, data obtained by measuring in advance a relationship between a pulse wave height value and radiation energy is stored, and thus it is possible to detect the energy of incident radiation from a signal pulse wave height value even when the TES 1 is irradiated with radiation having unknown energy.

In order to hold the TES 1 in the operation point during the superconductive transition, the operation point of the TES 1 is determined by a heat balance between a current (hereinafter, referred to as a TES current It) which flows to the TES 1 and a heat link to a heat sink provided within the TES 1. Since the energy resolution of the TES 1 is a function of temperature, the temperature may be lowered as much as possible. The heat sink temperature is set to, for example, approximately 50 mK to approximately 400 mK. The TES current It is determined by the following Expression 1.

$$It^2 Rt(T) = G(T - Tb) \quad (1)$$

In Expression 1 mentioned above, the TES current It is described by an operation resistance Rt of the TES 1, a thermal conductivity G of the heat link for thermally connecting a second thermometer 17 (described below with reference to FIG. 4) provided in the TES 1 and the heat sink, a temperature T of the second thermometer 17, and a temperature Tb of the heat sink.

Further, a relationship between the TES current It and a pulse wave height value ΔI is given by the following Expression 2. Ideally, when the TES current It is constant, always a constant pulse wave height value ΔI is obtained.

$$It = \frac{CT}{\alpha E} \Delta I \quad (2)$$

In Expression 2 mentioned above, the TES current It and the pulse wave height value ΔI are described by a sensitivity α of the TES 1, a heat capacity C, an energy E of emitted radiation, and a temperature T of the second thermometer 17. As seen from Expression 2, when a base line current flowing to the TES 1 varies, a wave height value of a signal pulse varies even when the TES 1 is irradiated with pieces of radiation having the same energy. In addition, as seen from Expression 1, when the temperature of the heat sink varies, the base line current flowing to the TES 1 varies. That is, when the heat sink fluctuates, the pulse wave height value ΔI also fluctuates, which results in a deterioration in energy resolution.

In response to the TES 1 being irradiated with radiation, a wave height value of a signal pulse associated with a temperature change occurring within the TES 1 changes to an increasing trend in association with an increase in a current (same as the TES current It) which flows to the SQUID amplifier 11, in accordance with Expression 2 mentioned above. As an example of the pulse wave height value ΔI, a calculation value obtained by processing a pulse signal using a band filter and then convoluting the processed signal is output to the spectrum display section 8.

At this time, a spectrum display screen in the spectrum display section 8 is displayed by representing a horizontal axis as a pulse wave height value ΔI and representing a vertical axis as a count. For example, when the pulse wave height value ΔI is 100, one is counted at the location of 100. A radiation spectrum is formed by repeating this process.

This means that a change in an output value after filtering in spite of the same energy results in a variation in the pulse wave height value ΔI. The degree of variation is equivalent to the above-mentioned energy resolution. That is, in order to realize a high energy resolution, a variation in the pulse wave height value ΔI has to be reduced with respect to the same energy.

The variation in the pulse wave height value ΔI is caused by a change in a current flowing to the SQUID amplifier 11. Therefore, as described above, in order to realize a high energy resolution, it is important to make a current flowing to the SQUID amplifier 11 constant or to adopt means for making the pulse wave height value ΔI constant even when a current flowing to the SQUID amplifier 11 changes.

Hereinafter, the radiation analyzing apparatus 100 according to the illustrative embodiment of the present invention will be described in detail.

The sensor circuit section 2 includes a shunt resistor 9 that has a resistance value smaller than that of the TES 1 and is connected to the TES 1 in parallel, and an input coil 10 which is connected to the TES 1 in series.

In the sensor circuit section 2, when a bias current is applied from the bias current source 3, the current is branched at a resistance ratio of a resistance value of the shunt resistor 9 to a resistance value of the TES 1. That is, a voltage value of the TES 1 is determined by a current flowing to the shunt resistor 9 and a voltage determined by a resistance value of the shunt resistor 9.

The current detection mechanism 4 includes the SQUID amplifier 11, and a room temperature amplifier 15 for amplifying and shaping an electrical signal which is output from the SQUID amplifier 11. Incidentally, as the current detection mechanism 4, the SQUID amplifier 11 and the room temperature amplifier 15 which use the input coil 10 are used, but other configurations can be adopted insofar as a change in a current flowing to the TES 1 can be detected.

Figure 2:
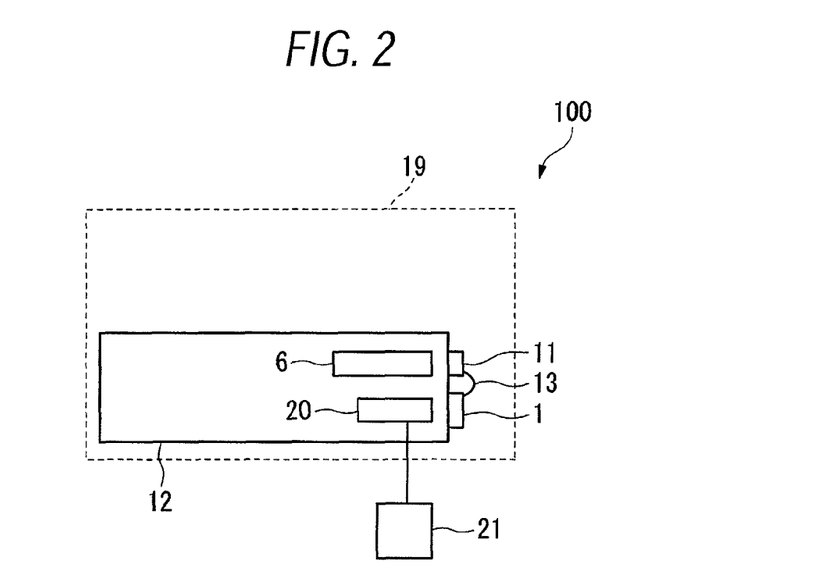
FIG. 2 is a schematic diagram illustrating a configuration of a portion of the radiation analyzing apparatus according to the illustrative embodiment of the present invention.
Figure 3:
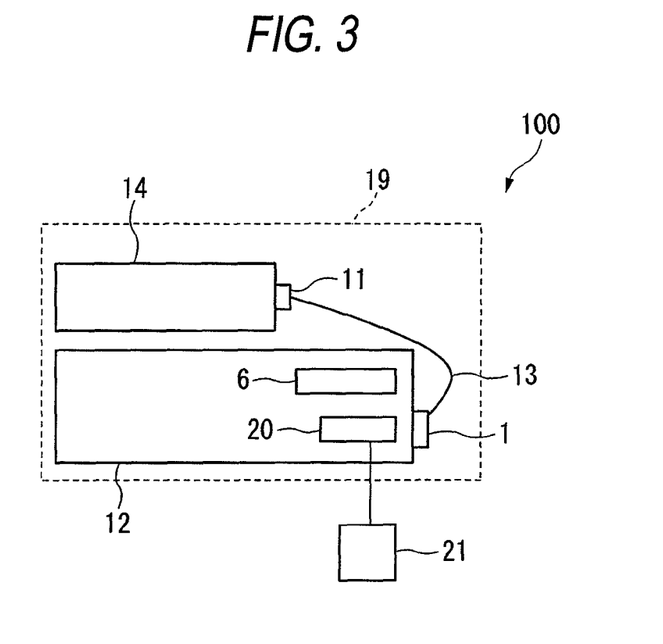
FIG. 3 is a schematic diagram illustrating a configuration of a portion of the radiation analyzing apparatus according to the illustrative embodiment of the present invention.

As illustrated in FIG. 2, the TES 1, the shunt resistor 9, and the SQUID amplifier 11 are provided at the tip of a cold head 12 which is cooled up to 50 mK to 400 mK by a refrigerator. Incidentally, the TES 1 and the SQUID amplifier 11 are connected through a superconductive wiring 13. As another example, as illustrated in FIG. 3, the TES 1 may be provided at the tip of the cold head 12, and the SQUID amplifier 11 may be provided at the tip of a cold block 14 which is cooled up to 9 K or less. Incidentally, the shunt resistor 9 is not shown in FIGS. 2 and 3.

The wave height analyzer 5 is a multi-channel pulse height analyzer that obtains a wave height value (voltage value) of a signal pulse from a radiation pulse signal transmitted from the room temperature amplifier 15 to thereby generate an energy spectrum. The wave height analyzer 5 reads a wave height value of a radiation pulse, and adds one count to the location of the wave height value in a graph in which a vertical axis represents a count and a horizontal axis represents a wave height value. The wave height analyzer 5 has a function of repeating the same operation on signal pulses of a plurality of pieces of radiation to thereby create a histogram and displaying the created histogram on the spectrum display section 8. The wave height analyzer 5 is one example of a spectrum generation unit.

In addition, when correction data for converting a voltage value of a signal pulse into energy in advance is incorporated in the wave height analyzer 5 or the spectrum display section 8, it is possible to display a spectrum in which a vertical axis represents a count and a horizontal axis represents energy.

The first thermometer 6 for monitoring the temperature of the cold head 12 is provided inside the cold head 12. The first thermometer 6 can be formed using a semiconductor, a superconductive body, or a metal oxide. For example, the first thermometer 6 can be formed using ruthenium oxide or germanium. The first thermometer 6 is configured to have a resistance value changing along with the temperature of the cold head, and can measure temperature by associating in advance temperature with an electrical signal (in general, a voltage signal) which is output from the first thermometer 6. It is possible to ascertain a temperature state of the cold head 12 using temperature when temperature and resistance are associated with each other in advance and directly using an electrical signal when temperature and resistance are not associated with each other.

The sensitivity correction arithmetic operation unit 7 is a mechanism for correcting a wave height value of a signal pulse which is output from the room temperature amplifier 15, that is, a detection sensitivity of the TES 1. The sensitivity correction arithmetic operation unit 7 receives data and an electrical signal of the power of a heater 20 used to make the temperature of the first thermometer 6 constant, and a signal of the amount of change in a bias current which is output from a base line monitor mechanism 31 to be described later, and corrects a pulse wave height value ΔI of the signal pulse. The sensitivity correction arithmetic operation unit 7 includes an arithmetic operation circuit for performing the above-mentioned correction process, and a memory, and is realized by program processing using a personal computer or the like, or is realized by dedicated hardware. In addition, the sensitivity correction arithmetic operation unit 7 may be integrated into the wave height analyzer 5 and the spectrum display section 8. Incidentally, a specific sensitivity correction method will be described later.

The spectrum display section 8 includes an arithmetic operation circuit, a memory, and a display such as a liquid crystal display. The arithmetic operation circuit and the memory of the spectrum display section 8 are realized by program processing using, for example, a personal computer or the like, or are realized by dedicated hardware. The spectrum display section 8 displays a setting screen for setting operation conditions of the sensitivity correction of the sensitivity correction arithmetic operation unit 7, and the like in accordance with an operator's input operation, and outputs an instruction signal in response to the input operation in the setting screen to the sensitivity correction arithmetic operation unit 7.

The spectrum display section 8 receives, from the wave height analyzer 5, data of a spectrum generated by a wave height value ΔI of a signal pulse corrected by the sensitivity correction arithmetic operation unit 7, and displays an energy spectrum of radiation detected by the TES 1 on a display.

Hereinafter, the principle of sensitivity correction performed by the sensitivity correction arithmetic operation unit 7 according to the illustrative embodiment of the present invention will be described.

Figure 4:
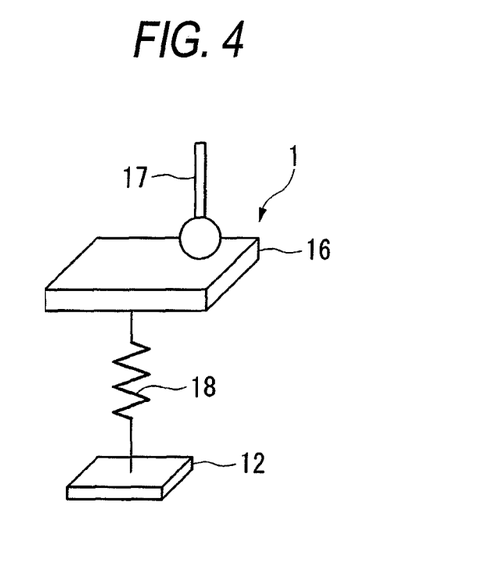
FIG. 4 is a schematic diagram illustrating a configuration of a TES of the radiation analyzing apparatus according to the illustrative embodiment of the present invention.

As illustrated in FIG. 4, the TES 1 includes an absorber 16, a second thermometer 17, and a membrane 18. The absorber 16 is a metal band, a semimetal, a superconductive body, or the like for absorbing radiation such as X-rays. The absorber 16 is formed of, for example, gold, copper, or bismuth. The second thermometer 17 is constituted by a superconductive body, and detects heat generated by the absorber 16 as a temperature change. The second thermometer 17 is formed of, for example, a material including two layers of titanium and gold. The membrane 18 thermally loosely connects the second thermometer 17 and the cold head 12, and controls a flow rate of heat escaping to a heat sink (cold head 12, not shown). The membrane 18 and the heat sink are formed of, for example, silicon nitride.

In order to hold the resistance value of the TES 1 in an intermediate state between a normal conductive and a superconductive, Joule heat generated by the second thermometer 17 thermally balances with the flow of heat flowing from the second thermometer 17 (or the absorber 16) to the cold head 12 through the membrane 18.

The thermal balance between Joule heat and the flow of heat traveling through the membrane 18 is given by Expression 1 mentioned above. In Expression 1 mentioned above, when it is considered that the TES current It is affected by a thermal fluctuation Pex from the outside of the TES 1, Expression 1 mentioned above is rewritten as Expression 3.

$$It^2 Rt(T) + \left(V + \frac{GT}{I\alpha}\right)\delta It + Pex = G(T - Tb) \quad (3)$$

When the thermal fluctuation Pex from the outside of the TES 1 increases, δIt in a second term on the left side decreases so as to satisfy Expression 3 mentioned above. Incidentally, examples of the thermal fluctuation Pex from the outside include a temperature fluctuation of the cold head 12 cooling the TES 1, a fluctuation in heat radiation due to a temperature fluctuation of a heat shield 19 surrounding the cold head 12, and a temperature fluctuation of the heat shield 19 due to heat conduction to the TES 1 from the heat shield 19 through a remaining gas which is present inside a refrigerator.

Regarding a relationship between a pulse wave height value $\Delta I$ and a current flowing to the TES 1, the pulse wave height value $\Delta I$ monotonously increases as the current flowing to the TES 1 increases as expressed by Expression 2 mentioned above. That is, in order to make the pulse wave height value $\Delta I$ with respect to pieces of radiation having the same energy constant, it is important to make the current flowing to the TES 1 constant.

In addition, the TES 1 is required to be cooled up to approximately 100 mK. Examples of a cooling unit include a dilution refrigerator and an adiabatic demagnetization refrigerator (hereinafter, referred to as an ADR). The former refrigerator relates to a technique for performing cooling using an enthalpy difference when 3He melts from a conc. phase (strong phase) to a dilute phase (weak phase) within a mixing chamber. The latter refrigerator relates to a technique for applying a magnetic field to a magnetic body to align the direction of spin and cooling an object connected to the magnetic body by an increase in enthalpy when removing the magnetic field. In both the refrigerators, the cold head 12 is installed at a location which is most cooled. In the dilution refrigerator and the ADR, the first thermometer 6 for measuring temperature is installed in the cold head 12, and it is possible to obtain temperature information of the cold head 12 by monitoring an electrical signal (in general, a voltage signal) which is output from the first thermometer 6. It is possible to ascertain temperature in real time by registering in advance a relationship between an electrical signal and temperature in a temperature control section 21. The temperature control section 21 is installed between the first thermometer 6 and the sensitivity correction arithmetic operation unit 7, and has a function of transmitting temperature data obtained by the first thermometer 6 or an electrical signal to the sensitivity correction arithmetic operation unit 7.

When the temperature of the cold head 12 is kept constant in the dilution refrigerator, the heater 20 is installed. The heater 20 is connected to the temperature control section 21. When a target temperature is set in the temperature control section 21, the temperature control section 21 controls an output of the heater 20 on the basis of temperature data of the first thermometer 6 or an electrical signal. In the case of the ADR, the temperature of the cold head 12 is kept constant by controlling the intensity of a magnetic field applied to a magnetic body on the basis of the temperature data of the first thermometer 6 or the electrical signal. Hereinafter, a method for correcting sensitivity on the basis of a dilution refrigerator will be described, but the same method can also be applied to an ADR.

As seen from Expression 1 and Expression 2, when the temperature of a heat sink falls, a pulse wave height value $\Delta I$ increases. In contrast, when the temperature of a heat sink rises, a pulse wave height value $\Delta I$ decreases. The temperature of the heat sink is monitored in the first thermometer 6. The temperature control section 21 adjusts an output of the heater 20 so that the temperature of the first thermometer 6 becomes constant, and adjusts temperature so that the first thermometer 6 has a constant value. For example, when the temperature of the heat sink falls, in order to make the temperature of the first thermometer 6 constant, the temperature control section 21 increases the output of the heater 20. The temperature control section 21 acquires an output value of the heater 20 (hereinafter referred to as a heater value) and transmits the acquired output value of the heater 20 to the sensitivity correction arithmetic operation unit 7. The temperature control section 21 is one example of a data acquisition unit.

In a relationship between an output of the heater 20 and a pulse wave height value $\Delta I$, the pulse wave height value $\Delta I$ changes to an increasing trend in association with an increase in the output of the heater 20. The output of the heater 20 is controlled so that the first thermometer 6 always keeps a constant value. As described above, a heater value changes due to the invasion of heat from the outside. The sensitivity correction arithmetic operation unit 7 defines a pulse wave height value $\Delta I$ of a certain heater value as a reference value, and stores a relationship between a result (first sensitivity correction value k1), which is obtained by dividing the pulse wave height value $\Delta I$ by the reference value, and the output of the heater 20. The first sensitivity correction value k1 changes to a decreasing trend in association with an increase in the output of the heater 20. When characteristics of the first sensitivity correction value k1 and the output of the heater 20 are once obtained, it is possible to obtain an accurate pulse wave height value $\Delta I$ by correcting a pulse wave height value $\Delta I$ which is actually obtained, using the first sensitivity correction value k1 corresponding to the actual output of the heater.

Similarly, when a relationship between a fluctuation in a current flowing to the TES 1 and a fluctuation in pulse wave height value $\Delta I$ is obtained in advance, it is possible to perform correction on a detected pulse wave height value $\Delta I$. A change in a current flowing to the TES 1 is monitored by the base line monitor mechanism 31, and correction is performed on a pulse wave height value $\Delta I$ detected in accordance with the value, and thus it is possible to avoid a problem in that pulse wave height values $\Delta I$ are different from each other when pieces of radiation having the same energy are incident, due to external disturbance.

The base line monitor mechanism 31 monitors a change in a current flowing to the TES 1, and transmits the amount of change in a current flowing to the TES 1 to the sensitivity correction arithmetic operation unit 7 as a signal. The sensitivity correction arithmetic operation unit 7 corrects an output signal from the room temperature amplifier 15 in accordance with the amount of change in the current flowing to the TES 1. The base line monitor mechanism 31 is one example of a data acquisition unit.

An upper limit and a lower limit can be set in the base line monitor mechanism 31 with respect to a signal from the room temperature amplifier 15, and a signal falling within the range is recognized as a base line.

For example, when the upper limit and the lower limit are respectively set to +100 mV and −100 mV, a signal from the room temperature amplifier 15 which falls within the range is always recognized as a base line signal. A fluctuation in a base line current is slower than a response frequency (equal to or higher than 100 Hz) of the TES 1, and thus it is desired that a current in the SQUID amplifier 11, that is, a sampling frequency of a current of the TES 1 is equal to or less than a commercial power frequency of 50 Hz. In addition, since the sampled current of the TES 1 has a statistical fluctuation, it is preferable that, for example, N pieces of sampling data are averaged and the averaged data is monitored.

The sensitivity correction arithmetic operation unit 7 defines a pulse wave height value $\Delta I$ of a certain base line as a reference value, and stores a relationship between a result (second sensitivity correction value k2) obtained by dividing the pulse wave height value ΔI by the reference value and the base line. The sensitivity correction arithmetic operation unit 7 may store a relationship between a fluctuation in a current flowing to the TES 1, a fluctuation in pulse wave height value ΔI, and radiation energy for the purpose of further increasing accuracy. The second sensitivity correction value k2 changes to an increasing trend in association with an increase in base line. When characteristics of the second sensitivity correction value k2 and the base line are once obtained, it is possible to obtain an accurate pulse wave height value ΔI by correcting a pulse wave height value ΔI which is actually obtained, using the second sensitivity correction value k2 corresponding to the actual base line.

Hereinafter, a description will be given of an operation example of the radiation analyzing apparatus 100 when the sensitivity correction arithmetic operation unit 7 acquires a first sensitivity correction value k1 and a second sensitivity correction value k2.

The sensitivity correction arithmetic operation unit 7 acquires a first sensitivity correction value k1 and a second sensitivity correction value k2 in an on-line mode during the execution of radiation measurement on an appropriate sample to be measured or in an off-line mode such as before the execution of radiation measurement on an appropriate sample to be measured or during the stopping of execution thereof. The sensitivity correction arithmetic operation unit 7 acquires the first sensitivity correction value k1 and the second sensitivity correction value k2 in accordance with operation conditions which are set in advance through the setting screen of the spectrum display section 8. On the setting screen, a screen for setting, for example, a timing at which and a period of time during which individual pieces of data of an output of the heater 20, which is used to set each of the first sensitivity correction value k1 and the second sensitivity correction value k2, and a base line of a current flowing to the TES 1 are acquired is displayed.

For example, when the sensitivity correction arithmetic operation unit 7 acquires the first sensitivity correction value k1 and the second sensitivity correction value k2 in an off-line mode, the temperature control section 21 confirms that a refrigerator is sufficiently cooled, receives temperature data from the first thermometer 6 or an electrical signal, and adjusts an output of the heater 20 so as to obtain a predetermined temperature or an electrical output value. The radiation analyzing apparatus 100 irradiates the TES 1 with known radiation energy after the output of the heater is stabilized, and acquires a signal pulse. The known radiation energy is, for example, 1487 eV which is an Al-Kα line. When the radiation analyzing apparatus 100 is mounted on an electron microscope, an electron beam having an accelerating voltage of at least equal to or greater than 1.5 kV is set in an aluminum sample. A current value of the electron beam is set so that a large number of signals of 1487 eV are obtained for a short period of time.

Figure 5:
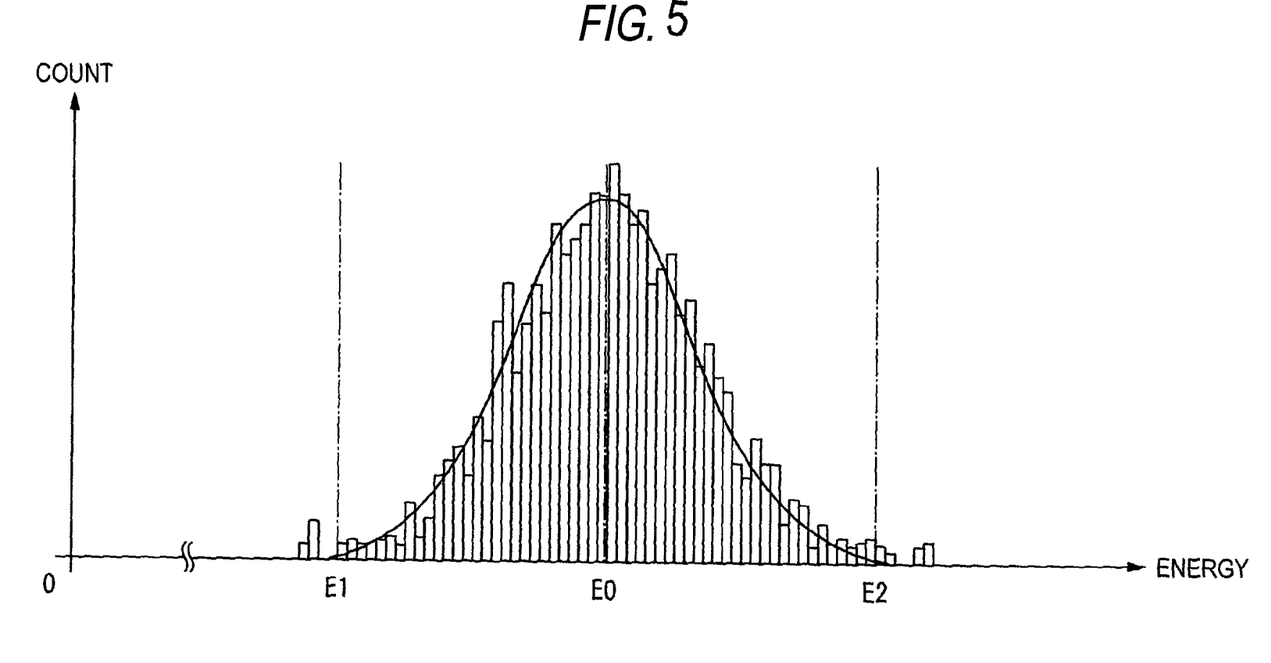
FIG. 5 is a diagram illustrating an example of a spectrum formed by data used when a sensitivity correction arithmetic operation unit of the radiation analyzing apparatus according to the illustrative embodiment of the present invention sets a first sensitivity correction value and a second sensitivity correction value.

First, the sensitivity correction arithmetic operation unit 7 acquires a pulse wave height value ΔI of a signal pulse in a reference heater value HP (that is, a detection value of an output of the heater) and a reference base line BL of a current flowing to the TES 1. The temperature control section 21 and the base line monitor mechanism 31 update the heater value HP and the base line BL, for example, in units of seconds. The sensitivity correction arithmetic operation unit 7 acquires a plurality of signal pulses over a certain time with respect to a heater value HP and a base line BL which are acquired at a certain timing or an average value of heater values HP and an average value of base lines BL acquired for a certain period of time at certain time intervals. As illustrated in FIG. 5, the sensitivity correction arithmetic operation unit 7 sets the center of a spectrum formed by a plurality of signal pulses as a signal pulse output corresponding to an acquired heater value HP and base line BL. A method of reading out the center of the spectrum includes the reading-out of the center of the spectrum through visual observation or the reading-out of the center of the spectrum through Gaussian fitting. For example, a signal pulse output when a heater value HP is 1.57 µW, which is one example of the reference heater value HP, is set to 100.000 mV. Since the energy of incident radiation is known already, energy corresponding to the signal pulse output when the heater value HP is 1.57 µW is specified as 1487 eV.

Next, the sensitivity correction arithmetic operation unit 7 acquires a plurality of signal pulses over a certain time with respect to a combination of a heater value HP and a base line BL which are different from the reference heater value HP and the reference base line BL. The sensitivity correction arithmetic operation unit 7 sets the center of a spectrum formed by the plurality of signal pulses as a signal pulse output corresponding to the combination of the heater value HP and the base line BL which are different from the reference heater value HP and the reference base line BL.

In this manner, the sensitivity correction arithmetic operation unit 7 acquires a plurality of pieces of corresponding data between the signal pulse output and the combination of the heater value HP and the base line BL different from the reference heater value HP and the reference base line BL. The sensitivity correction arithmetic operation unit 7 increases the number of pieces of corresponding data in order to increase the accuracy of correction.

The sensitivity correction arithmetic operation unit 7 calculates a first sensitivity correction value k1 and a second sensitivity correction value k2 for a reference signal pulse output with respect to each of the plurality of pieces of corresponding data. For example, when a signal pulse, which is output when a heater value HP different from a reference heater value HP is 1.7258 µW, is 101.015 mV, a value obtained by dividing a reference signal pulse output by the signal pulse output (=100/101.015=0.989953) is set to be a first sensitivity correction value k1.

Figure 6:
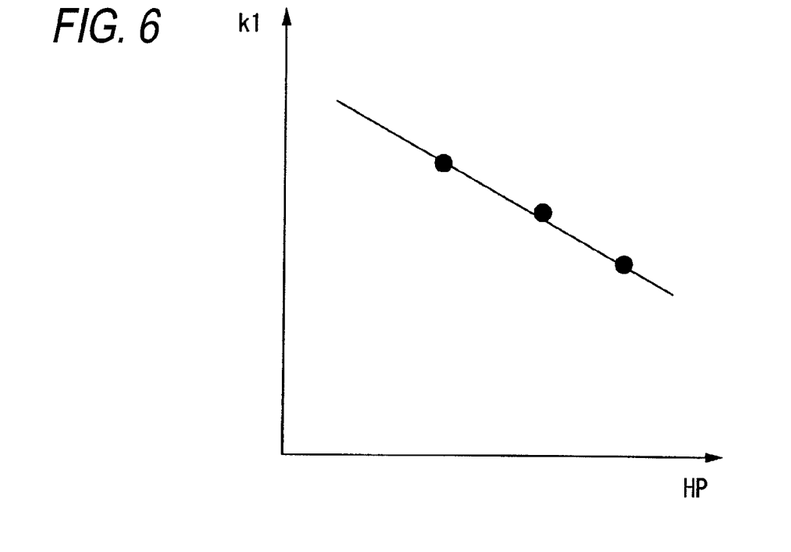
FIG. 6 is a diagram illustrating an example of data of a combination between the first sensitivity correction value generated by the sensitivity correction arithmetic operation unit of the radiation analyzing apparatus according to the illustrative embodiment of the present invention and an average value of heater values.
Figure 7:
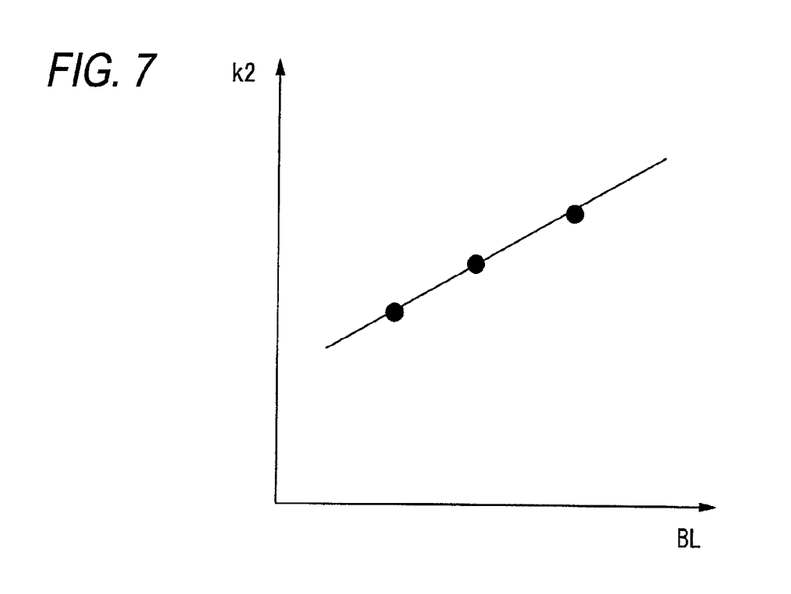
FIG. 7 is a diagram illustrating an example of data of a combination between the second sensitivity correction value generated by the sensitivity correction arithmetic operation unit of the radiation analyzing apparatus according to the illustrative embodiment of the present invention and an average value of base lines.

As illustrated in FIGS. 6 and 7, the sensitivity correction arithmetic operation unit 7 plots, in a graph, each of pieces of data of a plurality of combinations of a first sensitivity correction value k1 and a heater value HP and pieces of data of a plurality of combinations of a second sensitivity correction value k2 and a base line BL. The sensitivity correction arithmetic operation unit 7 creates a fitting curve with respect to obtained data. The curve is created using an n-order function (n is an integer), a spline method, or the like.

Hereinafter, a description will be given of an operation example of the radiation analyzing apparatus 100 when the sensitivity correction arithmetic operation unit 7 performs sensitivity correction using a first sensitivity correction value k1 and a second sensitivity correction value k2 in an on-line mode or an off-line mode.

Figure 8:
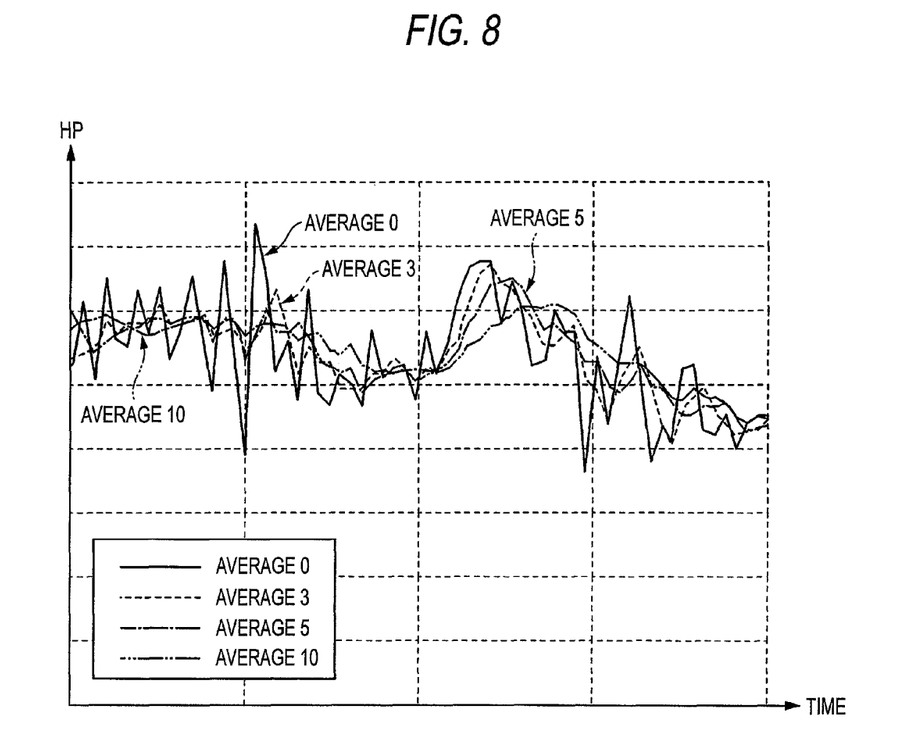
FIG. 8 is a diagram illustrating examples of an average value of the heater values and an average value of the base lines generated by the sensitivity correction arithmetic operation unit of the radiation analyzing apparatus according to the illustrative embodiment of the present invention.

The sensitivity correction arithmetic operation unit 7 associates a heater value HP and a base line BL at a timing and for a period of time which are set in advance through a setting screen of the spectrum display section 8 with signal pulse outputs which are sequentially output from the wave height analyzer 5 by radiation measurement performed on an appropriate sample to be measured. For example, the sensitivity correction arithmetic operation unit 7 sets an average value of each of a predetermined number (for example, any of three, five, and ten) of heater values HP and an average value of a predetermined number of base lines BL close to a timing of a signal pulse output which is output from the wave height analyzer 5, as a heater value HP and a base line BL at the timing of the signal pulse output. For example, the sensitivity correction arithmetic operation unit 7 sets an average value of a predetermined number of heater values HP and base lines BL which are acquired from the present time to the proximate past with respect to a signal pulse output at the present time, as a heater value HP and a base line BL at the present time. As illustrated in FIG. 8, an average value (ave. 3, 5, 10) of a predetermined number of proximate heater values HP (for example, any of three, five, and ten) indicates a more gentle fluctuation than a heater value HP (ave. 0) at an appropriate timing.

The sensitivity correction arithmetic operation unit 7 corrects a signal pulse output which is output from the wave height analyzer 5 by applying the first sensitivity correction value k1 and/or the second sensitivity correction value k2 on the basis of the above-described corresponding heater value HP and/or the base line BL. Here, the first sensitivity correction value k1 and/or the second sensitivity correction value k2 applied to correct the signal pulse output correspond to the heater value HP and/or the base line BL of the signal pulse output, which are average values of the predetermined number of the heater values HP and/or the base lines BL close to the timing of said signal pulse output.

As described above, according to the radiation analyzing apparatus 100 of the present illustrative embodiment, the sensitivity correction arithmetic operation unit 7 can perform sensitivity correction of a signal pulse output by arbitrarily setting a temporal correspondence between a signal pulse output which is output from the wave height analyzer 5 and a heater value HP and a base line BL which have correlation with the detection sensitivity of the TES 1. Thereby, it is possible to appropriately perform the sensitivity correction of a signal pulse output in a state where a desired accuracy and reliability of the heater value HP and the base line BL are secured, while avoiding a period in which the detection accuracy and reliability of the heater value HP and the base line BL are low. It is possible to suppress a deterioration in correction accuracy, due to a fluctuation in errors of a heater value HP and a base line BL which are used to correct a signal pulse output.

Hereinafter, a modification example will be described.

In the above-described illustrative embodiment, average values of respective predetermined numbers of proximate heater values HP and base lines BL with respect to a timing of a signal pulse output which is output from the wave height analyzer 5 are set to be a heater value HP and a base line BL at the timing of the signal pulse output, but the present invention is not limited thereto.

The sensitivity correction arithmetic operation unit 7 may associate a plurality of heater values HP and base lines BL at an appropriate timing with a signal pulse output at any timing by adding time information of a timing at which each of a plurality of heater values HP and base lines BL is acquired to the heater values HP and the base lines BL.

For example, the sensitivity correction arithmetic operation unit 7 may associate an average value of a predetermined number of heater values HP and an average value of a predetermined number of base lines BL which are acquired for a predetermined period of time at an appropriate timing in the past earlier than the present time with a signal pulse output as a heater value HP and a base line BL at the present time.

For example, the sensitivity correction arithmetic operation unit 7 may associate an average value of a predetermined number of heater values HP and an average value of a predetermined number of base lines BL which are acquired from the present time to the proximate past with a signal pulse output as a heater value HP and a base line BL at an appropriate time in the future.

According to this modification example, a timing of a signal pulse output is not limited to the proximate past, and it is possible to easily perform the sensitivity correction of a signal pulse output using a plurality of heater values HP and base lines BL at any timing in the past.

In the above-described illustrative embodiment, the sensitivity correction of a signal pulse output is performed using a heater value HP and a base line BL, but the present invention is not limited thereto.

The sensitivity correction arithmetic operation unit 7 may perform the sensitivity correction of a signal pulse output using at least any of a heater value HP and a base line BL.

Incidentally, the technical scope of the present invention is not limited to the above-described illustrative embodiment, and includes various modifications' added to the above-describe illustrative embodiment, without departing from the scope of the present invention. That is, the configuration of the above-described illustrative embodiment is just an example, and a modification can be appropriately made.

What is claimed is:

1. A radiation analyzing apparatus comprising:
   a superconductive transition edge sensor configured to detect radiation;
   a spectrum generation unit configured to generate an energy spectrum of the radiation using a detection signal which is output from the superconductive transition edge sensor;
   a data acquisition unit configured to acquire a physical quantity of data having correlation with detection sensitivity of the superconductive transition edge sensor; and
   a sensitivity correction unit configured to associate the detection signal output from the superconductive transition edge sensor at a certain timing with the physical quantity of a plurality of pieces of data acquired by the data acquisition unit at a plurality of different timings over a predetermined period of time and to correct the detection signal output at said certain timing in accordance with the detection sensitivity of the superconductive transition edge sensor by using information regarding correlation between the physical quantity of the plurality of pieces of data and the detection sensitivity of the superconductive transition edge sensor,
   wherein the sensitivity correction unit is configured to correct the detection signal at said certain timing in accordance with the detection sensitivity of the superconductive transition edge sensor by using the information regarding correlation between average value of the physical quantity of the plurality of pieces of data and the detection sensitivity of the superconductive transition edge sensor.

2. The radiation analyzing apparatus according to claim 1, wherein the data acquisition unit is configured to add time information to the physical quantity of data, the time information regarding a timing at which each of the physical quantity of the plurality of pieces of data is acquired, and
   wherein the sensitivity correction unit corrects the detection sensitivity of the superconductive transition edge sensor by using the time information added to each of the physical quantity of the plurality of pieces of data.

3. The radiation analyzing apparatus according to claim 1, wherein the data acquisition unit acquires an output of a heater that heats the superconductive transition edge sensor as the physical quantity.

4. The radiation analyzing apparatus according to claim 1, wherein the data acquisition unit acquires a current flowing to the superconductive transition edge sensor as the physical quantity.

5. A radiation analyzing apparatus comprising:
- a superconductive transition edge sensor configured to detect radiation;
- a spectrum generation unit configured to generate an energy spectrum of the radiation using a detection signal which is output from the superconductive transition edge sensor;
- a heater that heats the superconductive transition edge sensor;
- a current source that flows current through the superconductive transition edge sensor;
- a data acquisition unit configured to acquire a physical quantity of data, including pieces of data representing the output of the heater and pieces of data representing the current flowing through the superconductive transition edge sensor, having correlation with detection sensitivity of the superconductive transition edge sensor; and
- a sensitivity correction unit configured to associate the detection signal output from the superconductive transition edge sensor at a certain timing with the physical quantity of a plurality of pieces of data representing the output of the heater and the current flowing through the semiconductive transition edge sensor acquired by the data acquisition unit at a plurality of different timings over a predetermined period of time and to correct the detection signal output at said certain timing in accordance with the detection sensitivity of the superconductive transition edge sensor by using information regarding correlation between the physical quantity of the plurality of pieces of data and the detection sensitivity of the superconductive transition edge sensor.

6. The radiation analyzing apparatus according to claim 5, wherein the sensitivity correction unit is configured to correct the detection signal at said certain timing in accordance with the detection sensitivity of the superconductive transition edge sensor by using the information regarding correlation between average value of the physical quantity of the plurality of pieces of data and the detection sensitivity of the superconductive transition edge sensor.

7. The radiation analyzing apparatus according to claim 5,
wherein the data acquisition unit is configured to add time information to the physical quantity of data, the time information regarding a timing at which each of the physical quantity of the plurality of pieces of data is acquired, and
wherein the sensitivity correction unit corrects the detection sensitivity of the superconductive transition edge sensor by using the time information added to each of the physical quantity of the plurality of pieces of data.

* * * * *